(12) United States Patent
Pagano

(10) Patent No.: US 11,378,453 B2
(45) Date of Patent: Jul. 5, 2022

(54) CUBESAT INFRARED ATMOSPHERIC SOUNDER (CIRAS)

(71) Applicant: California Institute of Technology, Pasadena, CA (US)

(72) Inventor: Thomas S. Pagano, Thousand Oaks, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 143 days.

(21) Appl. No.: 16/584,726

(22) Filed: Sep. 26, 2019

(65) Prior Publication Data
US 2020/0096388 A1    Mar. 26, 2020

Related U.S. Application Data

(60) Provisional application No. 62/736,656, filed on Sep. 26, 2018.

(51) Int. Cl.
*G01J 3/28* (2006.01)
*G01J 3/02* (2006.01)
(Continued)

(52) U.S. Cl.
CPC ............. *G01J 3/2803* (2013.01); *G01J 3/021* (2013.01); *G01J 3/0208* (2013.01); *G01J 3/0216* (2013.01); *G01J 3/0256* (2013.01); *G01J 3/04* (2013.01); *G01J 3/06* (2013.01); *G01J 3/108* (2013.01); *G01J 3/18* (2013.01); *G01W 1/08* (2013.01); *G01J 2003/064* (2013.01); *G01J 2003/1842* (2013.01); *G01J 2003/283* (2013.01); *G01J 2003/2813* (2013.01)

(58) Field of Classification Search
CPC ......... G01J 2003/064; G01J 2003/1842; G01J 2003/2813; G01J 2003/283; G01J 3/0208; G01J 3/021; G01J 3/0216; G01J 3/0256; G01J 3/0264; G01J 3/0286; G01J 3/0291; G01J 3/04; G01J 3/06; G01J 3/108; G01J 3/18; G01J 3/2803; G01W 1/08
USPC ......................................................... 356/51
See application file for complete search history.

(56) References Cited

U.S. PATENT DOCUMENTS 6,678,048 B1  1/2004 Rienstra et al.
2001/0015755 A1*  8/2001 Mathews ............... H04N 5/372
                                                            348/144
(Continued)

OTHER PUBLICATIONS

Observing Systems Capability Analysis and Review Tool (OSCAR), www.wmosat.iliro/oscar/instruments/view/3. Downloaded from the internet Mar. 4, 2019.
(Continued)

*Primary Examiner* — Sunghee Y Gray
(74) *Attorney, Agent, or Firm* — Gates & Cooper LLP

(57) ABSTRACT

A CubeSat compatible spectrometer including a slit having a first length and first width; a diffraction grating; and a two dimensional focal plane array electromagnetically coupled to the diffraction grating. The 2D focal plane array includes an array of pixels including a plurality of sets of pixels. Diffraction of electromagnetic radiation transmitted through the slit by the diffraction grating forms a plurality of beams, each of the beams comprising a different one of the bands of the wavelengths in the electromagnetic radiation, and each of the beams transmitted onto a different one of the sets of the pixels.

20 Claims, 12 Drawing Sheets

(51) Int. Cl.
  *G01J 3/04* (2006.01)
  *G01J 3/18* (2006.01)
  *G01J 3/10* (2006.01)
  *G01J 3/06* (2006.01)
  *G01W 1/08* (2006.01)

(56) References Cited

U.S. PATENT DOCUMENTS

| | | | | |
|---|---|---|---|---|
| 2002/0175286 | A1* | 11/2002 | Murguia | G01J 3/2823 250/339.07 |
| 2003/0133109 | A1* | 7/2003 | Murguia | G01J 3/14 356/326 |
| 2010/0238440 | A1* | 9/2010 | Oskotsky | G01J 3/0208 356/328 |
| 2010/0245818 | A1 | 9/2010 | Viard et al. | |
| 2011/0176577 | A1 | 7/2011 | Bandara et al. | |
| 2011/0303837 | A1* | 12/2011 | Prather | H01J 49/0095 250/282 |
| 2013/0083312 | A1* | 4/2013 | Baraniuk | G01J 5/0834 356/51 |
| 2015/0021480 | A1* | 1/2015 | Chrisp | G01J 3/0208 250/339.05 |
| 2015/0177348 | A1* | 6/2015 | Peng | G01N 24/08 324/309 |
| 2016/0138974 | A1* | 5/2016 | Silny | G01J 3/0232 356/328 |
| 2016/0187535 | A1 | 6/2016 | Maschhoff et al. | |
| 2017/0241766 | A1* | 8/2017 | Arieli | G01J 3/0208 |
| 2018/0106673 | A1* | 4/2018 | Pagano | G01J 3/36 |

OTHER PUBLICATIONS

Li, J., T. Schmit, X. Jin, G. Martin, .GOES-R Advanced Baseline Imager (ABI) Algorithm Theoretical Basis Document for Legacy Atmospheric Moisture Profile, Legacy Atmospheric Temperature Profile, Total Precipitable Water, and Derived Atmospheric Stability Indices. http://www.goesr.gov/products/ATBDs/baseline/Sounding_LAP_v2.0_no_color.pdf, Sep. 2010, 106 pages.

Pagano, T.S., Aumann, H., Gerber, A., Kuai, L., Gontijo, I., DeLeon, B., Susskind, J., Iredell, L., Bajpai, S., "Requirements for a Moderate-resolution Infrared Imaging Sounder (MIRIS)", Proc. SPIE 8870-7, San Diego, CA (2013), 9 pages.

R Demers et al., The CHROMA focal plane array: a large-format, low-noise detector optimized for imaging spectroscopy, Proc SPIE, vol. 8870, (2013) DOI: 10.1117/12.2029617, 7 pages.

Cardinali, C, "Monitoring the observation impact on the short-range forecast", Q. J. R. Meteorol. Soc. 135, pp. 239-250 (2009).

http://www.vision-systems.com/articles/print/volume-20/issue-7/departments/technology-trends/filters-and-optics-multispectral-filters-let-cameravendors-target-niche-markets.html. Downloaded from the internet Mar. 4, 2019.ring the observation impact on the short-range forecast, Q. J. R. Meteorol. Soc. 135, pp. 239-250 (2009).

http://www.northropgrumman.com/Capabilities/HighEfficiencyCryocoolers/Documents/pageDocs/HighEfficiencyCryocoolerPerformanceICC18.pdf, 8 pages, Downloaded from the internet Mar. 4, 2019.

Canadian Space Agency, Polar Communication and Weather (PCW) Mission Requirements Document, CSA-PCWRD-003, Revision C, Jun. 11, 2013, NCAGE Code: L0889, 12 pages, https://earth.esa.int/workshops/spaceandthearctic09/kroupnik.pdf, Downloaded from the internet on Mar. 4, 2019.

Malin, M. C., et al. "Mars Color Imager (MARCI) on the Mars Climate Orbiter." Journal of Geophysical Research: Planets 106. ES (2001 ): 17651-17672 (Year: 2001).

* cited by examiner

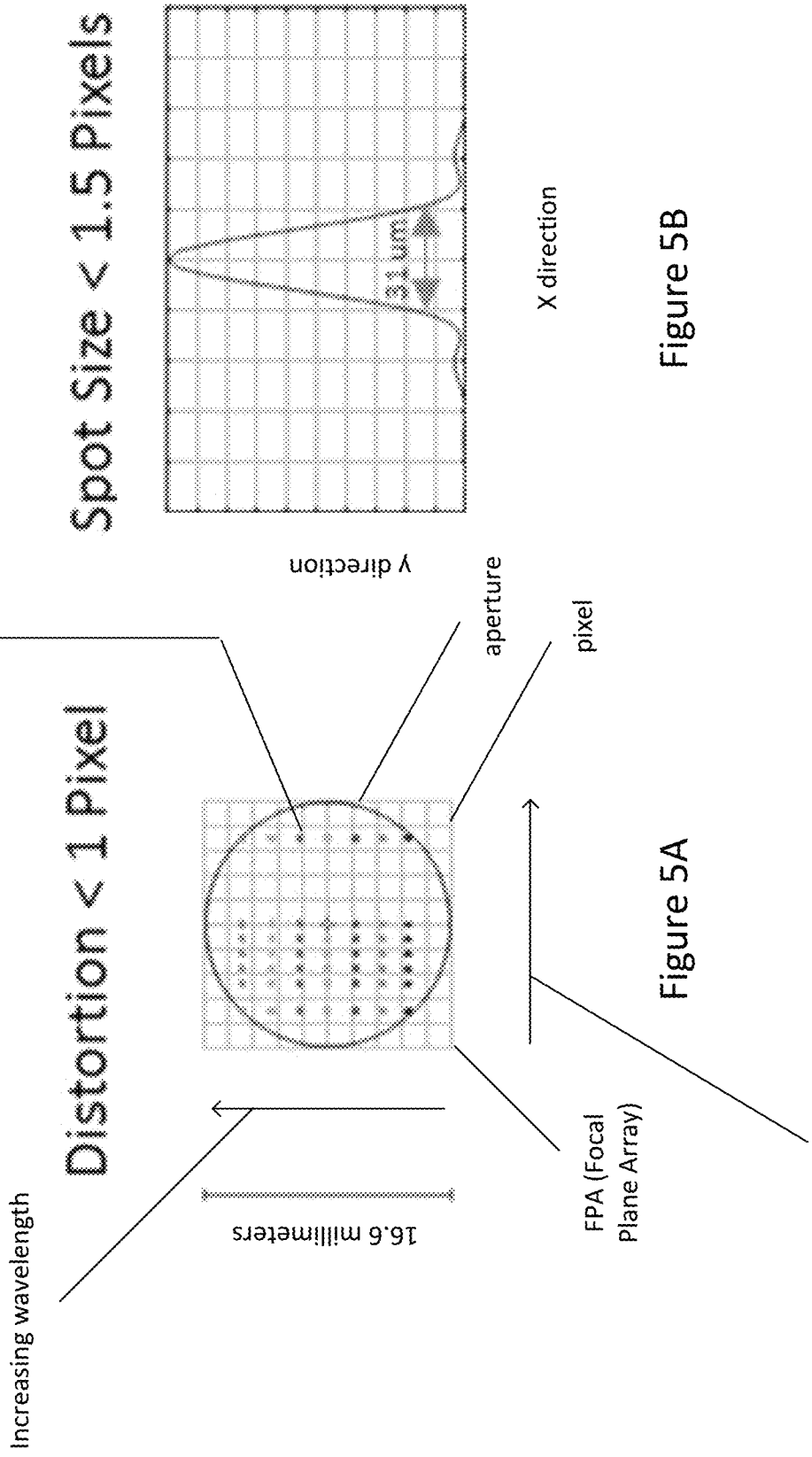

CUBESAT INFRARED ATMOSPHERIC SOUNDER (CIRAS)

CROSS REFERENCE TO RELATED APPLICATIONS

This application claims the benefit under 35 U.S.C. Section 119(e) of commonly-assigned U.S. Provisional Patent Application Ser. No. 62/736,656 filed on Sep. 26, 2018, entitled "CubeSat Infrared Atmospheric Sounder," by Thomas S. Pagano, Hartmut H. Aumann, Sarath Gunapala, Cate Heneghan, Curt A. Henry, Dean L. Johnson, Jose I. Rodriguez, Andreas C. Kuhnert, Kim M. Aaron, Marc S. Lane, Colin McKinney, Sir B. Rafol, Mayer Rud, Karl Y. Yee, Andrew U. Lamborn, Yuki Maruyama, Robert F. Jamot, Andres Andrade, and Thomas U. Kampe (CIT-7306-P); which application is incorporated by reference herein.

STATEMENT REGARDING FEDERALLY SPONSORED RESEARCH AND DEVELOPMENT

This invention was made with government support under Grant No. 80NM0018D004 awarded by NASA (JPL). The government has certain rights in the invention.

BACKGROUND OF THE INVENTION

1. Field of the Invention

This invention relates to a spectrometer and methods of making the same.

2. Description of the Related Art (Note: This application references a number of different publications as indicated throughout the specification by one or more reference numbers within brackets, e.g., [x]. A list of these different publications ordered according to these reference numbers can be found below in the section entitled "References." Each of these publications is incorporated by reference herein.)

Hyperspectral radiances measured from Low Earth Orbiting (LEO) infrared (IR) sounders including the NASA Atmospheric Infrared Sounder (AIRS) on Aqua, and the Cross-track Infrared Sounder (CrIS) on the Joint Polar Satellite System (JPSS), have among the highest impact of any measurement type when assimilated into operational weather forecast models. LEO IR sounder radiances are used to retrieve temperature and moisture profiles with high vertical accuracy. Maintaining continuity of these important weather forecasting and climate data sets is critical to NASA and the National Oceanic and Atmospheric Administration (NOAA). The high cost and long development times can take needed agency funds away from other programs and new capabilities and lead to coverage gaps if a satellite were to fail. NOAA has identified the need for an Earth Observation Nanosatellite-IR (EON-IR) as a low cost-to-orbit way to mitigate a potential gap in data of the CrIS on JPSS and build robustness in the government satellite program by reducing development costs. What is needed is a weather mapping system that can be incorporated on this reduced size platform. The present disclosure satisfies this need.

SUMMARY OF THE INVENTION

The present disclosure describes a spectrometer (e.g., grating spectrometer), comprising a slit having a first length and first width; a diffraction grating; and a two dimensional focal plane array electromagnetically coupled to the diffraction grating.

The spectrometer can be embodied in many ways including, but not limited to, the following.

1. The 2D focal plane array comprising an array of pixels including a first plurality of groups of the pixels, each of the groups having a second width in a first direction and a second length in a second direction, wherein the second length of the set of pixels is aligned with the first length of the slit. The slit transmits electromagnetic radiation received on the slit, the electromagnetic radiation comprising a plurality of bands of wavelengths, the diffraction grating diffracts the electromagnetic radiation transmitted through the slit into a plurality of beams, each of the beams comprise a portion of the electromagnetic radiation comprising a different one of the bands of the wavelengths, and each of the beams are transmitted onto a different one of the groups of the pixels. In one or more examples, each pixel illuminated by a given band comprises one channel for that band. In one or more examples, there are a plurality of channels for each band.

2. The spectrometer of embodiment 1, wherein the diffracting grating comprises an immersion grating.

3. The spectrometer of embodiment 1 or 2, wherein:
the bands of wavelengths include a first band comprising a first range of infrared wavelengths divided into a first plurality of channels and a second band comprising a second range of infrared wavelengths divided into a second plurality of channels; and
the groups of pixels include a first group of the pixels detecting the first plurality of channels and a second group of the pixels detect the second plurality of the channels.

4. The spectrometer of embodiment 3, wherein the first band comprises electromagnetic radiation having wavelengths in a range of 4.08-4.6 microns and the second band comprises electromagnetic radiation having wavelengths in a range of 4.6-5.13 microns. In one or more examples, the first plurality of channels includes 312 channels and the second plurality of channels includes 313 channels for a total of 625 channels.

5. The spectrometer of embodiment 1 or 2, wherein:
the bands of wavelengths include a first band, a second band, and optionally a third band,
the groups include a first group of the pixels, a second group of the pixels, and/or a third group of the pixels, each of the groups of pixels detecting a plurality of channels (e.g., n channels, where n is an integer) in each of the bands,
the first groups of the pixels receives or detects the channels in the first band including visible wavelengths forming a spatial image of one or more fields of view transmitting the electromagnetic radiation, and/or
the second group of the pixels receives or detects channels in the second band including a first range of infrared wavelengths, and/or
the third group of the pixels receives or detects the channels in the third band including a second range of infrared wavelengths.

6. The spectrometer of any of the preceding embodiments, wherein:
each of the groups of the pixels include a plurality of sets of the pixels indexed with an integer n according to position along the first direction,
the channels within each band are indexed with the integer n according to position along the first direction,
the wavelength of the $n+1^{th}$ channel is longer than the wavelength of the $n^{th}$ channel, and the $n^{th}$ set of the pixels receives or detects the $n^{th}$ channel of the wavelengths.

7. The spectrometer of embodiment 5, wherein the 1st band of wavelengths comprises visible wavelengths.

8. The spectrometer of any of the preceding embodiments, further comprising:

a mirror collecting the electromagnetic radiation in one or more fields of view;

a telescope positioned between the slit and the mirror, the telescope imaging the one or more fields of view on the slit;

a collimator between the slit and the diffraction grating, wherein the collimator collimates the electromagnetic radiation transmitted through the slit; a grating to disperse the energy across the different bands and channels, and an imager imaging each of the beams onto the 2D focal plane array.

9. The spectrometer of embodiment 8, further comprising an actuator connected to the mirror, the actuator rotating the mirror and scanning the field of view inputted onto the mirror over one or more regions of a planet's atmosphere.

10. The spectrometer of embodiment 9, wherein the rotating scans the one or more fields of view in a cross track direction comprising the first direction perpendicular to the second direction, the second direction parallel to the first length of the slit and parallel to a third direction of movement of the satellite or vehicle including the spectrometer.

11. The spectrometer of any of the preceding embodiments, wherein each of the sets of pixels include a plurality of subsets of the pixels indexed with an integer m along the second direction parallel to the first length of the slit, each of the subsets including a plurality of the pixels and receiving the electromagnetic radiation forming a spatial image of one of the areas in the field of view.

12. A satellite including the spectrometer of any of the preceding embodiments 10, wherein the satellite is in orbit around Earth and moving in the third direction.

13. The spectrometer of any of the preceding embodiments, further comprising a electronics and a computer coupled to the spectrometer, the electronics receiving signals outputted from one or more of the pixels in response to the beams, wherein the computer rectifies and calibrates the signals.

14. The spectrometer of any of the preceding embodiments, wherein:

the actuator scans the field of view over a plurality of the regions of a planet's surface or atmosphere indexed with an integer k along the cross-track direction, the $k^{th}$ region is adjacent the $(k-1)^{th}$ region in the cross-track direction; and the signals comprise a set of signals for each of a plurality of image frames indexed with the integer k, each of the k image frames comprising an image of the field of view including the $k^{th}$ region.

15. The spectrometer of embodiment 14, wherein each of the set of signals comprise an average of pixels signals outputted from each of the plurality of the pixels in one of the subsets of the pixels indexed with an integer m along the second direction parallel to the first length of the slit.

The present disclosure further describes a method of mapping a weather condition. The method can be embodied in many ways including, but not limited to, the following.

16. The method comprising transmitting electromagnetic radiation through a slit having a first length and first width; diffracting the electromagnetic radiation transmitted through the slit, forming diffracted electromagnetic radiation comprising a plurality of beams; and collecting the diffracted electromagnetic radiation on a 2D focal plane, the 2D focal plane array comprising an array of pixels including a plurality of groups of pixels, each of the groups having a second width in a first direction and a second length in a second direction, wherein the second length of the set of pixels is aligned with the first length of the slit. The electromagnetic radiation comprises a plurality of bands of wavelengths, each of the beams comprise a portion of the electromagnetic radiation comprising a different one of the bands of the wavelengths, and each of the beams are transmitted onto a different one of the groups of the pixels, or channels. The method further comprises outputting signals from the pixels in response to the beams of electromagnetic radiation; and mapping weather using the signals.

17. The method of embodiment 16, further comprising:

collecting the electromagnetic radiation in one or more fields of view on a mirror;

imaging the one or more fields of view on the slit using a telescope;

collimating the electromagnetic radiation transmitted through the slit; and imaging each of the beams onto the 2D focal plane array.

18. The method of embodiments 16 or 17, further comprising scanning the field of view (e.g., inputted onto the mirror) over one or more regions of a planet's atmosphere.

19. The method of any of the embodiments 16-18, further comprising receiving, with electronics, signals outputted from the pixels in response to the beams, wherein the computer rectifies and calibrates the signals.

20. The method of any of the embodiments 16-19, further comprising scanning the field of view in a cross track direction comprising the first direction perpendicular to the second direction, the second direction parallel to the first length of the slit and parallel to a third direction of movement of a satellite including the spectrometer.

21. The method of any of the embodiments 16-20, wherein:

the sets of channels within a band are indexed with an integer n according to position along the first direction, each of the groups of the pixels include a plurality of sets of the pixels indexed with the integer n according to position along the first direction, the $n+1^{th}$ channel of wavelengths are longer the wavelength of the $n^{th}$ channel of wavelengths, the $n^{th}$ set of the pixels receives or detects the $n^{th}$ channel of the wavelengths, each of the sets of pixels include a plurality of subsets of the pixels indexed with an integer m along the second direction parallel to the first length of the slit, each of the subsets including a plurality of the pixels and receiving the electromagnetic radiation forming a spatial image of one of a plurality of areas in the field of view.

the mirror scans the field of view over a plurality of regions indexed with an integer k along the cross-track direction, the $k^{th}$ region adjacent the $(k-1)^{th}$ region in the cross-track direction; and the signals comprise a set of signals for each of a plurality of image frames indexed with the integer k, each of the k image frames comprising an image of the field of view including the $k^{th}$ region, and the method further comprising integrating the signals so that each of the sets of signals comprise an average of pixel signals outputted from each of the plurality of the pixels in one of the subsets of the pixels.

22. The method of any of the embodiments 16-21, wherein the field of view along a length of the slit (in the along track direction or second direction) is sufficiently wide (e.g., in a range of 5-25 degrees) so that the scanning in the cross track direction (first direction perpendicular to the second direction) can be slowed or reduced and the integrating is over a longer period of time so that the spectrometer and the aperture receiving the electromagnetic radiation (e.g., surface area of the mirror) can fit inside a CubeSat form factor. In one or more examples, the spectrometer and the aperture fit within a volume of 5 meters by 5 meters by 5 meters.

23. The spectrometer or method of any of the previous embodiments, wherein:

the slit, the grating, the mirror, the telescope, the collimator, the imager, and/or the diffraction grating are sized and positioned so that:

the spectrometer fits inside a volume of 25 centimeters by 25 centimeter by 15 centimeters, and/or the spectrometer fits inside an unmanned aerial vehicle, a CubeSat, a drone, or a portable computer or communications device.

BRIEF DESCRIPTION OF THE DRAWINGS

Referring now to the drawings in which like reference numbers represent corresponding parts throughout:

FIG. 5A shows the focused spots of electromagnetic radiation dispersed across the focal plane array, wherein longer wavelengths are dispersed to the right and towards the top. Also shown in FIG. 5A is the aperture and the focal plane array. FIG. 5B illustrates the full width at half maximum (FWHM) of the spot of electromagnetic radiation focused on the focal plane array. The FWHM is less than 1.5 pixels.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

Example CubeSat Infrared Atmospheric Sounder (CIRAS)

Figure 1:
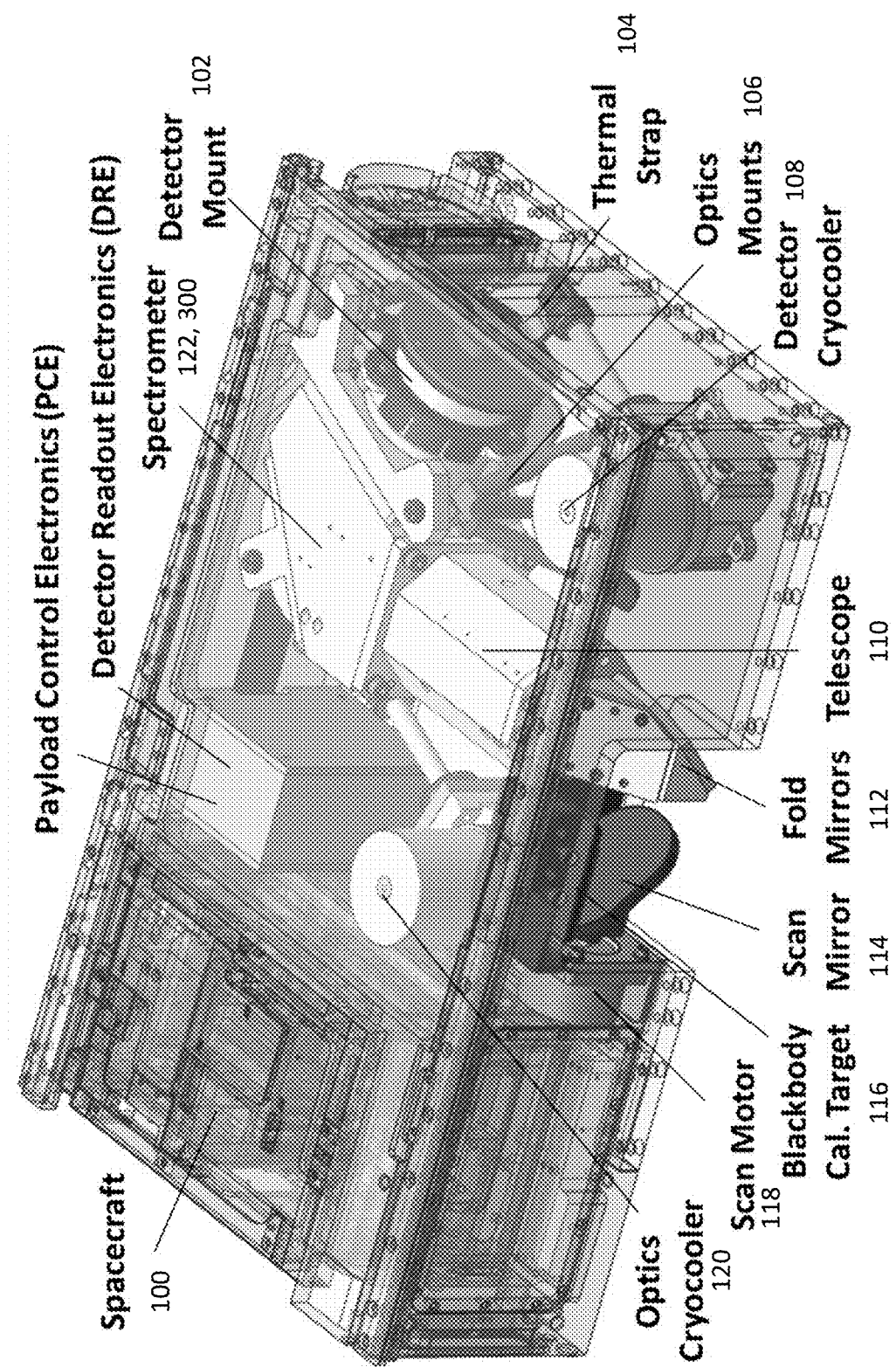
FIG. 1. CubeSat Infrared Atmospheric Sounder (CIRAS) mechanical configuration according to one or more embodiments of the present invention.

FIG. 1 illustrates an example CubeSat Infrared Atmospheric Sounder (CIRAS). The CIRAS combines the latest space-ready technologies available in the US government and aerospace industry and a novel optical system according to embodiments described herein to arrive at a significant size and mass reduction compared to currently available systems. Table 1 compares the performance, the size, mass and power requirements of CIRAS to those of the Crosstrack Infrared Sounder (CrIS) on the JPSS Spacecraft.

FIG. 1 illustrates the CIRAS includes a spacecraft 100; payload control electronics (PCE); detector readout electronics DRE; detector mount 102 (e.g., for focal plane array in the spectrometer); thermal strap 104; optics mounts 106; detector cryocooler 108; telescope 110; fold mirrors 112; scan mirror 114; blackbody calibration target 116; scan motor 118; optics cryocooler 120; and the spectrometer 122.

TABLE 1

CrIS Performance and CIRAS Requirements.
CIRAS focuses on the lower-troposphere.

| Parameter | CrIS Performance | CIRAS Requirement |
| --- | --- | --- |
| Spectral Range | 650-2550 $cm^{-1}$ | 1950-2450 $cm^{-1}$ |
| Spectral Resolution | 0.9 $cm^{-1}$ | 1.2-2.0 $cm^{-1}$ |
| Spatial Coverage | 2200 km | 1520/161 km |
| Spatial Resolution | 13.5 km | 13.5/3 km |
| NEdT | <0.2 K | <0.2 K |
| Size | 0.9 × 0.8 × 0.55 m | 6 U |
| Mass | 117 kg | 14 kg |
| Power | 90 W | 30 W |

TABLE 2

CIRAS Key Parameters

| Parameter | Value |
| --- | --- |
| Altitude (km) | 600 |
| Inclination (°) | 98.7 |
| Ground Vel. (km/s) | 6.91 |
| FOV (km) | 13.50 |
| N_FOVs_trk | 12 |
| Swath (±°) | 50.9 |
| Swath (km) | 1606.5 |
| Scan Rate (rads/s) | 0.09 |
| Frame Rate (Hz) | 12 |
| Frames/FOV | 3 |
| Aperture (mm) | 15.0 |
| f/# | 3.0 |
| Spectral Min (μm) | 4.08 |

TABLE 2-continued

CIRAS Key Parameters

| Parameter | Value |
| --- | --- |
| Spectral Max (μm) | 5.13 |
| Spectral Res (nm) | 3.37 |
| Slit Width (μm) | 48 |
| Dispersion (μm/rads) | 3.14 |
| Detector Size (μm) | 24.0 |
| Pixels/FOV | 42 |
| Pixels/Slit_x_trk | 2.0 |

Figure 2:
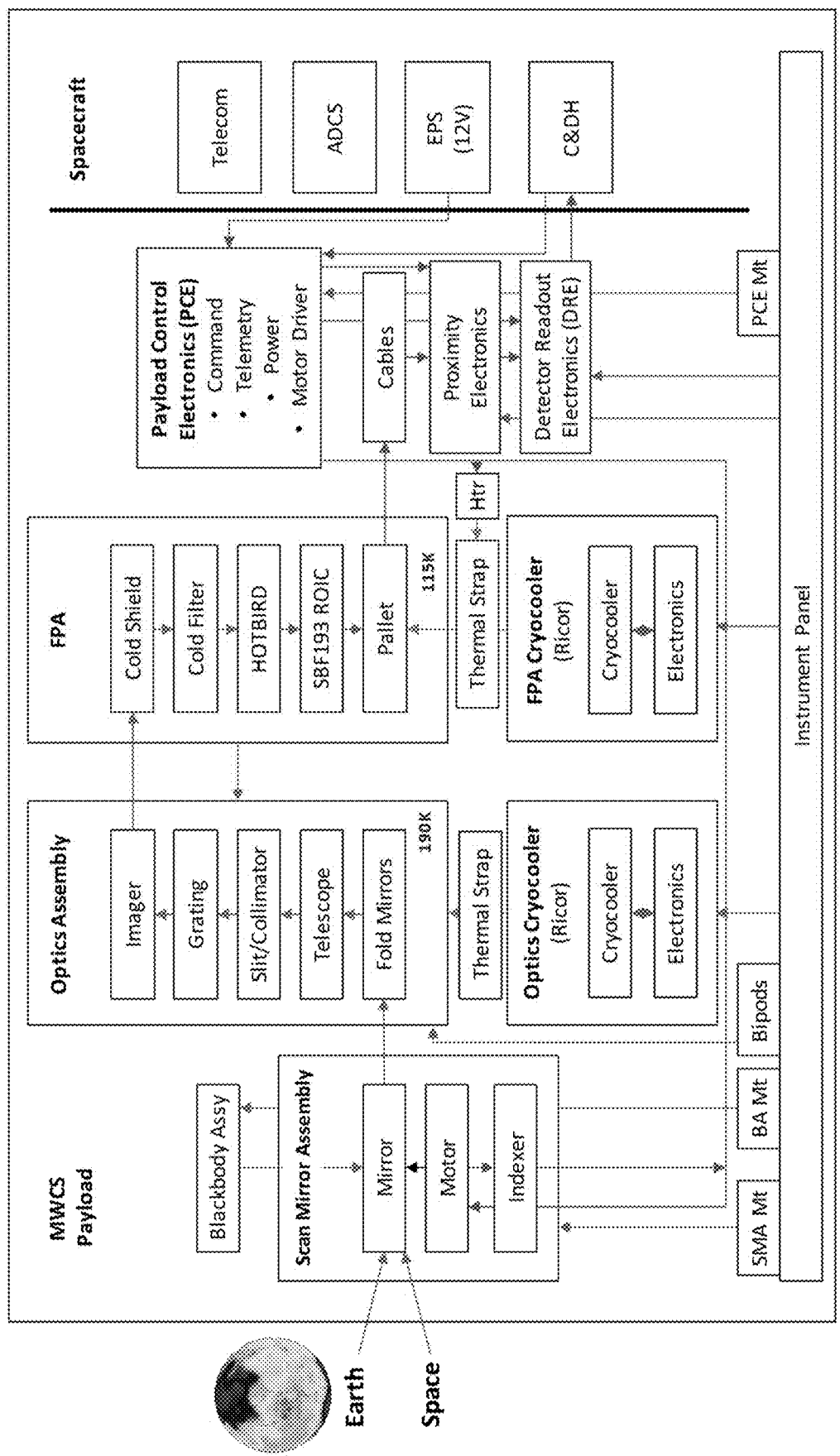
FIG. 2. Block diagram of a CIRAS instrument according to one or more embodiments of the present invention.

FIG. 2 illustrates a block diagram of the CIRAS instrument of FIG. 1. Key instrument parameters (for a 600 km orbit) is given in Table 2.

Energy from the Earth scene is directed to an all refractive telescope using a scan mirror mounted to a stepper motor. The scan mirror can rotate 360° to view Earth, cold space and an internal blackbody for calibration. The blackbody is a simple flat plate composed of black silicon, heat sunk and instrumented with a temperature sensor, and provides high emissivity and durability in a compact design. Energy from the telescope is focused onto the entrance slit of an all refractive mid-wave infrared (MWIR) Grating Spectrometer (MGS) (see FIG. 3). By covering a very small spectral range, the spectrometer maximizes sensitivity to temperature and water vapor in the MWIR band while minimizing the sensitivity to solar reflected energy and background loading on the detector. The telescope and spectrometer are cooled to 185K using the Ricor K508N rotary Stirling cooler. The spectrometer disperses the energy across the spectral range and produces a 2-dimensional image at the focal plane so that one direction contains spatial information and the other direction contains spectral information.

The detector array uses the JPL HOT-BIRD photosensitive material mounted on a Lockheed Martin Santa Barbara Focalplane (SBF) 193 Readout Integrated Circuit (ROIC). The ROIC is mounted in a pallet that in turn is mounted to the housing of the optics assembly. Clocks, biases and A/D conversion are performed using commercial electronics. The detector is cooled to 115K also using a Ricor K508N cryocooler. Both cryocoolers are heat sunk to the spacecraft chassis. System electronics interfaces with the scanner, camera, cryocoolers, blackbody and spacecraft electronics. Electronics, cryocooler and spacecraft waste heat is dissipated in warm temperature radiators on all surfaces. This enables operation of the system in any near circular LEO orbit. The CIRAS spacecraft includes a standard commercial 6U bus. Additional detail for all subsystems is provided in the following section.

Example Spectrometer

Figure 3A:
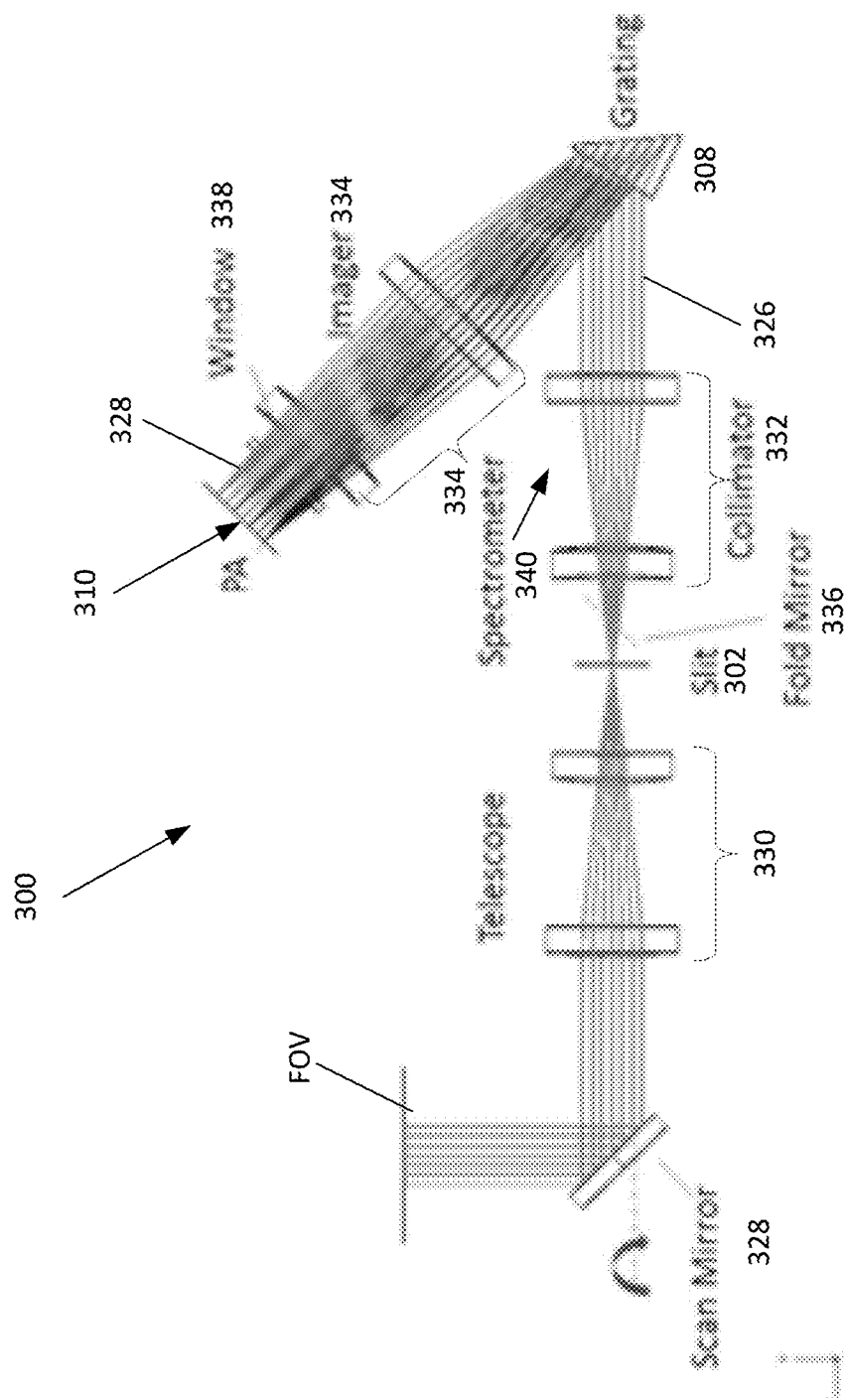
FIG. 3A. Unfolded ray trace of an optical system used in the CIRAS, according to one or more embodiments of the present invention.

FIG. 3A illustrates a multi-spectral imaging apparatus or spectrometer 300, 122 (e.g., grating spectrometer) comprising a slit 302 having a first length 304 and first width 306 (see FIG. 3B); a diffraction grating 308 (e.g., immersion grating); and a two dimensional (2D) focal plane array 310 electromagnetically coupled to the diffraction grating.

Figure 3B:
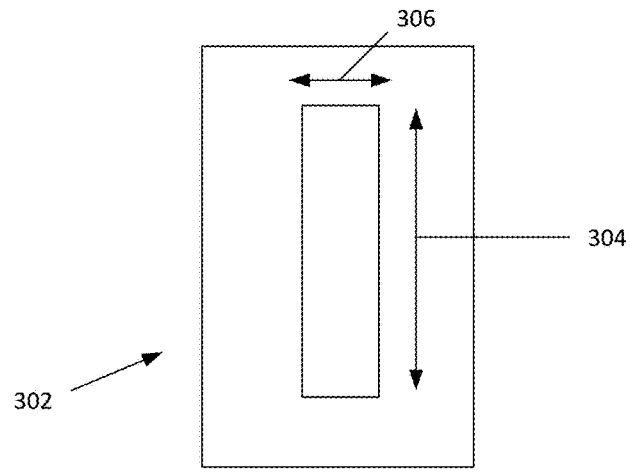
FIG. 3B. Schematic of a slit in the optical system illustrated in FIG. 3A.
Figure 3C:
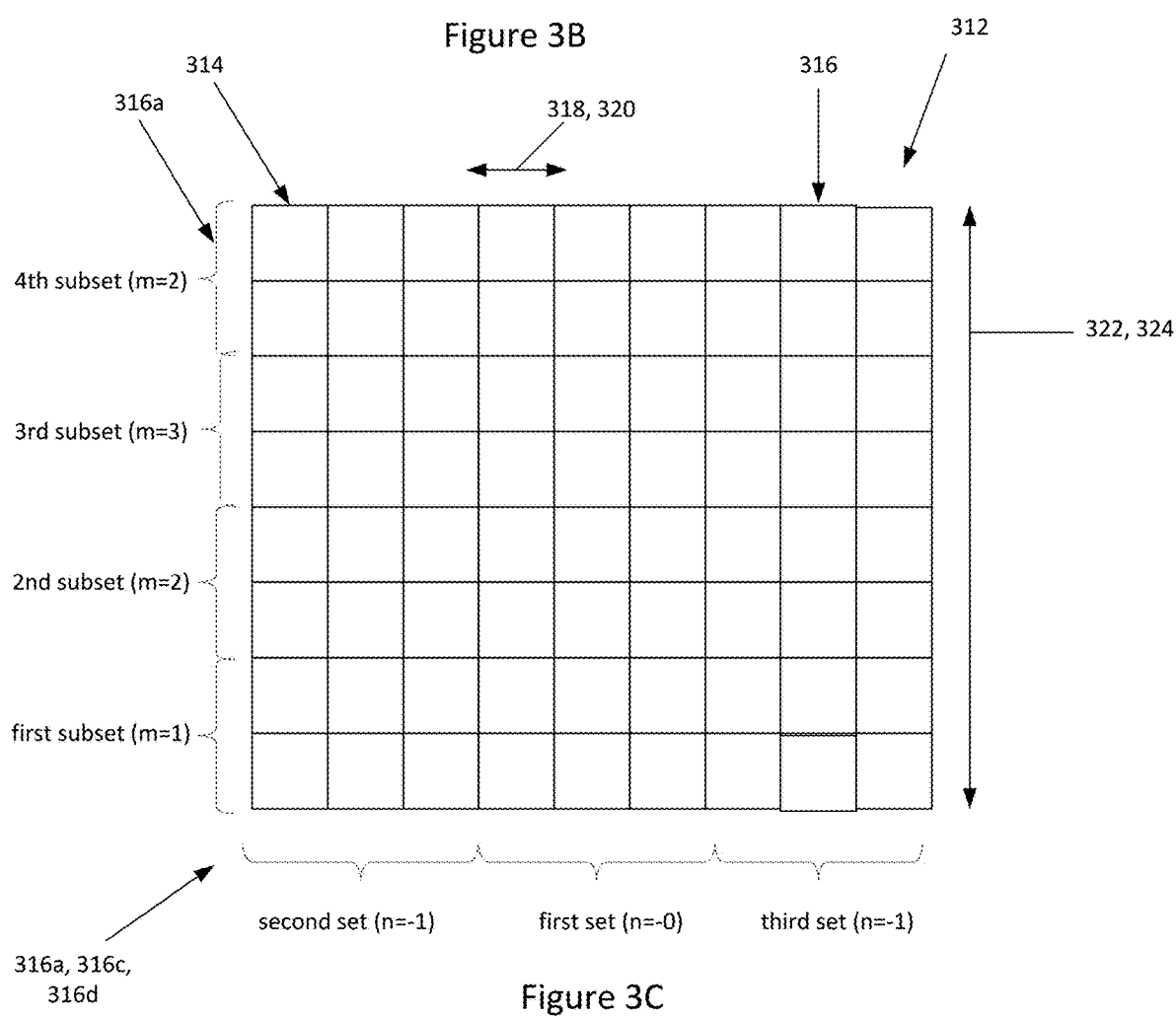
FIG. 3C. Schematic of a focal plane array used in the optical system illustrated in FIG. 3A.

FIG. 3C illustrates the 2D focal plane array comprises an array 312 including a plurality of groups 316 of the pixels 314, each of the groups having a second width 318 in a first direction 320 and a second length 322 in a second direction 324, wherein the second length 322 of the set of pixels is aligned with the first length 304 of the slit. Electromagnetic radiation 326 comprising a plurality of bands of wavelengths is transmitted through the slit. Diffraction of the electromagnetic radiation 326 (transmitted through the slit) by the diffraction grating forms a plurality of beams 328, each of the beams comprising a portion of the electromagnetic radiation comprising a different one of the bands of the wavelengths, and each of the beams transmitted onto a different one of the groups of the pixels or channels.

In one example, the bands of wavelengths include a first band comprising a first range of infrared wavelengths divided into a first plurality of channels and a second band comprising a second range of infrared wavelengths divided into a second plurality of channels. The groups of pixels include a first group of the pixels detecting the first plurality of channels and a second groups of the pixels detect the second plurality of the channels. In another example, the first band comprises electromagnetic radiation having wavelengths in a range of 4.08-4.6 microns and the second band comprises electromagnetic radiation having wavelengths in a range of 4.6-5.13 microns. In one or more examples, the first plurality of channels includes 312 channels and the second plurality of channels includes 313 channels for a total of 625 channels.

In yet another example, the bands of wavelengths include a first band, a second band, and optionally a third band, the groups include a first group of the pixels, a second group of the pixels, and/or a third group of the pixels, each of the groups of pixels detecting a plurality of channels $316d$ (e.g., n channels, where n is an integer) in each of the bands. The first groups of the pixels receives or detects the channels in the first band including visible wavelengths forming a spatial image of one or more fields of view transmitting the electromagnetic radiation. The second group of the pixels receives or detects channels in the second band including a first range of infrared wavelengths, and/or the third group of the pixels receives or detects the channels in the third band including a second range of infrared wavelengths. FIG. 3C illustrates each of the groups of the pixels include a plurality of sets $316c$ of the pixels indexed with an integer n according to position along the first direction. The channels within each band are also indexed with the integer n according to position along the first direction, so that the wavelength of the $n+1^{th}$ channel is longer than the wavelength of the $n^{th}$ channel and the $n^{th}$ set of the pixels receives or detects the $n^{th}$ channel of the wavelengths. In this way, the spectrometer can collect information on a plurality of spectral ranges from each field of view.

Figure 3D:
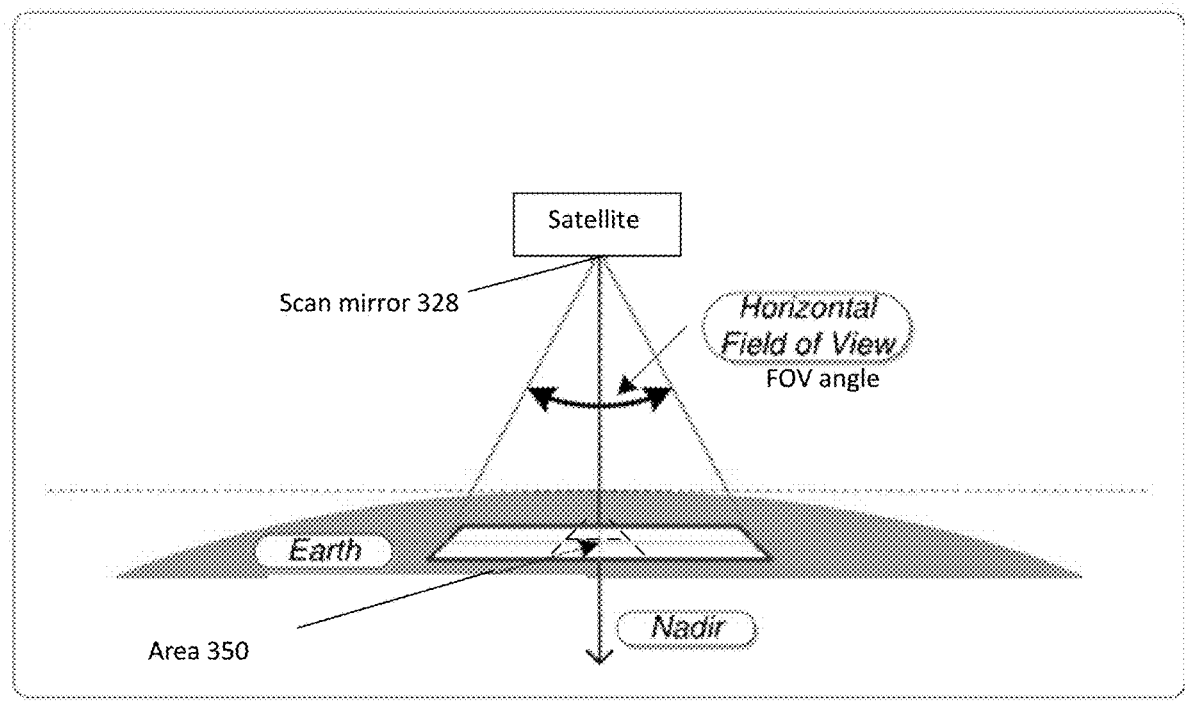
FIG. 3D. Schematic of a satellite field of view (FOV).

FIG. 3C further illustrates each of the sets 316 of pixels further include a plurality of subsets $316a$ of the pixels indexed with an integer m along the second direction parallel to the first length of the slit. In one or more examples, pixel signals outputted from each of the plurality of the pixels in each of the subsets $316a$ (and in response to the electromagnetic radiation) are averaged or integrated to form an averaged signal. The averaged signal from each of the subsets in response to the electromagnetic radiation is then used to form a spatial image of one of the areas 350 in the field of view, as illustrated in FIG. 3D. In one or more examples, each subset includes 10-50 pixels (e.g., 42 pixels) and the slit transmits electromagnetic radiation to at least 10-50 (e.g., 42) subsets so that spatial images of at least 10-50 (e.g., 42) areas 350 within the field of view are generated. FIG. 3D illustrates each field of view FOV inputted onto the scanning mirror 328 is represented by a solid angle (FOV angle) through which the scanning mirror 328 receives electromagnetic radiation. In one or more examples, the solid angle is in a range of ≤±60 degrees (e.g. ±55 degrees) cross-track by 5-25 degrees along-track (e.g., 15.4 degrees).

FIG. 3A further illustrates a mirror 328, 114 collecting the electromagnetic radiation 326 in a field of view (FOV); a telescope 330, 110 positioned between the slit and the mirror, the telescope imaging the field of view (FOV) on the slit; a collimator 332 between the slit and the diffraction grating, wherein the collimator collimates the electromagnetic radiation transmitted through the slit; and an imager 334 imaging each of the beams onto the 2D focal plane array. An actuator connected to the mirror rotates the mirror so as to scan the field of view inputted onto the mirror over a region (e.g., of a planet's atmosphere).

The spectrometer/imaging apparatus 300 of FIG. 3A, FIG. 3B, and FIG. 3C has many applications including, but not limited to, the CIRAS 100 described herein. The optical system in the CIRAS can comprise two main subsystems—the telescope and the spectrometer 122; 300 configured as a MWIR Grating Spectrometer (MGS) 340, as illustrated in FIG. 3A. The MGS is a critical new enabling technology that enables operation of the CIRAS. In the CIRAS example of FIG. 1, The 15 mm aperture telescope forms a telecentric image at the entrance slit of the MGS. Light passing through the slit is collimated by the collimator optics, then dispersed by the diffraction grating in the MGS, and imaged at the sensor (FPA). The diffraction grating is built into the backside of a silicon substrate (e.g., the diffraction grating comprises an immersion grating) to maximize dispersion and minimize distortion. The optical system includes a scan mirror 328 and a fold mirror 336 to fit the layout within the CubeSat allocated volume. Also shown is a window 338 transmitting the beams onto the focal plane array.

Example Scan Pattern and Figures of Merit

Figure 4A:
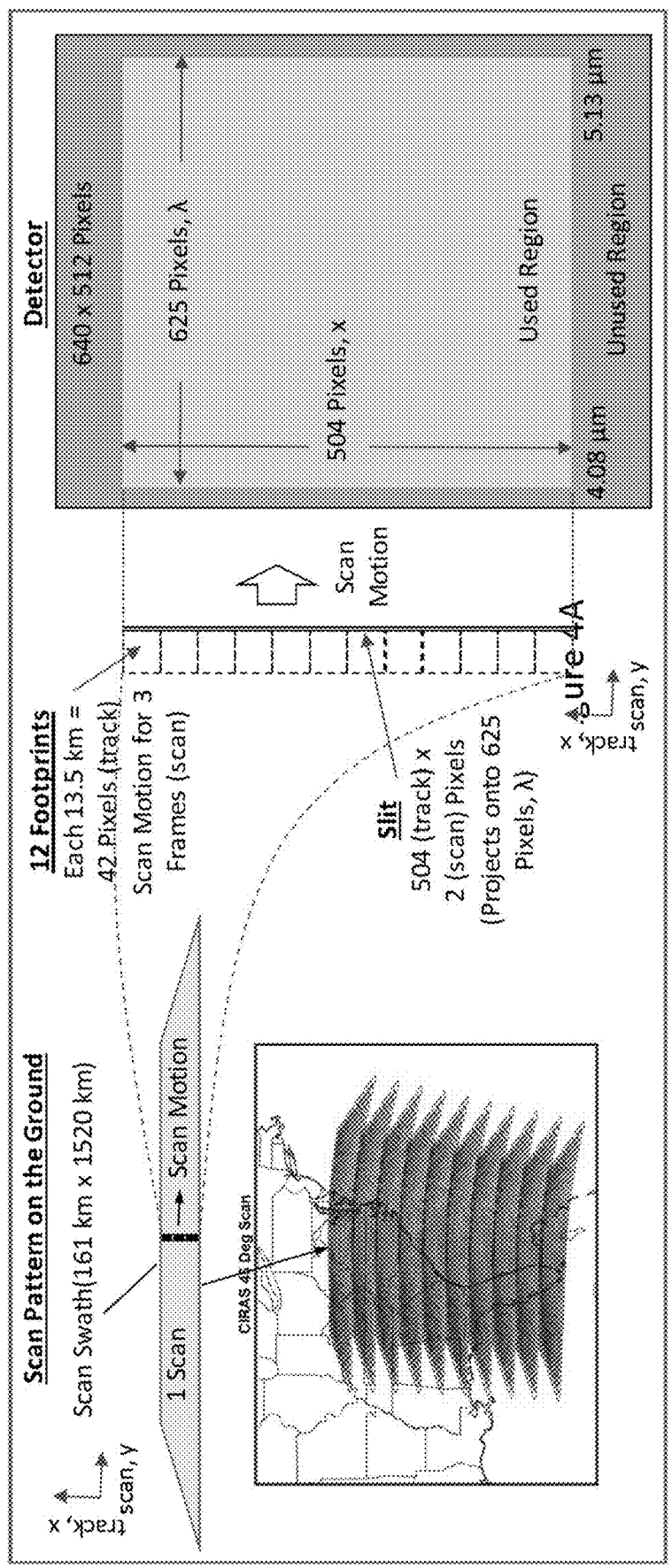
FIG. 4A. Scan pattern and projection on the ground and detector for CIRAS in the JPSS orbit. CIRAS makes 12 Fields of View (FOVs) by scanning the slit for 3 frames and averaging 42 pixels along track per FOV. The scanning is known as push whisk scanning.

The scan pattern, orientation of the slit, and projection on the detector array are shown in FIG. 4A. The CIRAS spatial resolution is designed to match CrIS from the JPSS orbit, but can be adjusted at any time in flight software for ISS or other LEO orbit by changing the pixel aggregation scheme and scanner rate and range. Calculations show comparable NEDT in either the JPSS or ISS orbit. Higher/Lower spatial resolution and/or narrower/broader swath are possible with this design by adjusting the pixel aggregation scheme and scan rate and range.

Figure 4B:
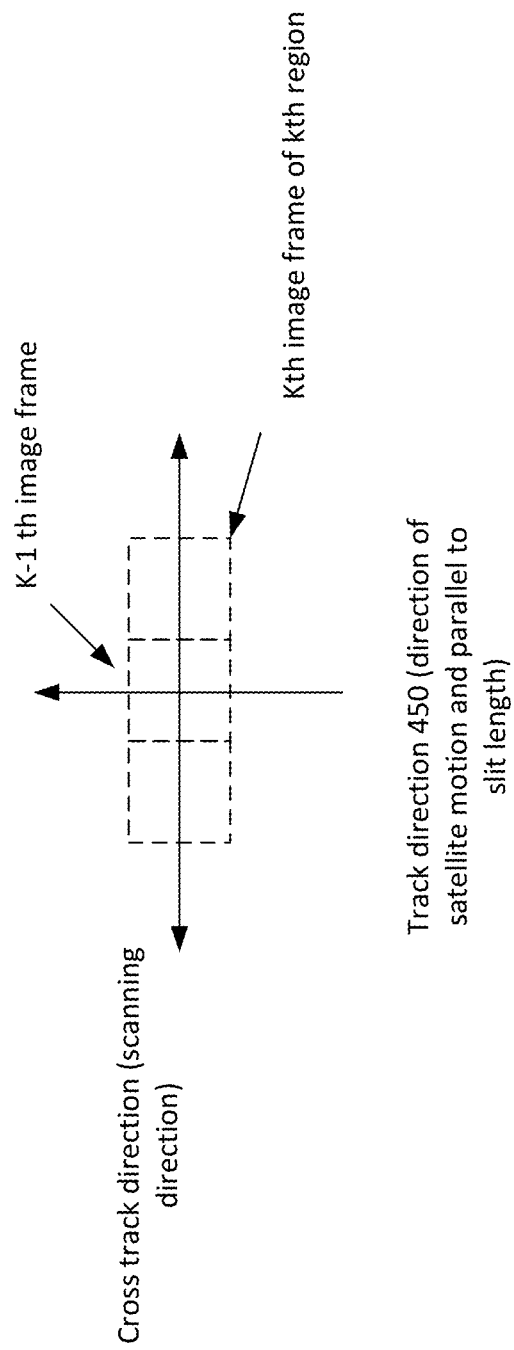
FIG. 4B. Illustration of scanning the field of view over adjacent regions of the planet's surface so as to obtain an image frame for each region, according to one or more embodiments described herein FIGS. 5A-5B. Plot of image distortion and resolution (spatial and spectral) of the CIRAS showing the image distortion and resolution meet requirements for a weather mapping application, according to one or more embodiments described herein.

FIG. 4B illustrates how the actuator scans the field of view, in a cross-track direction, over a plurality of the regions of the planet's surface or atmosphere, wherein the regions are indexed with an integer k along the cross-track direction and the $k^{th}$ region is adjacent the $(k-1)^{th}$ region. The signals, outputted from the pixels 312 in response to the electromagnetic radiation, comprise a set of signals, each set of the signals for each of a plurality of image frames indexed with the integer k, so that one or more of the k image frames comprise an image of the field of view over the $k^{th}$ region.

The novelty in CIRAS is that it uses a wide-field scanning approach that maximizes the time allowed for integrating signal radiance, leading to the need for a smaller telescope aperture. Prior systems had a significantly smaller field of view and faster scan rates. CrIS scan rate is 12.5°/s, while an example CIRAS scan rate is 5.16°/s. CIRAS achieves this using large format focal plane assemblies with 504 elements in the track direction and an optical field of view of 15.4°, compared to CrIS having an optical field of view of 3.3°. The result is a significant reduction in size, mass and power as indicated in Table 1. Note that the Long Wave Infrared (LWIR) band (corresponding to wavelength from 5.13-15 micrometers) is not included in this version, but can be added with an increase in size, mass and power.

Example Components

The CIRAS apparatus of FIG. 1 makes extensive use of commercial technologies including spacecraft structure and components, scan motor, Ricor K508N cryocooler, detector readout and electronic components. Many of the subsystems within the CIRAS including the thermal control system, payload electronics, scan mirror, telescope, and mechanical system use designs unique to CIRAS but are sufficiently established by current engineering practices.

HOT-BIRD Detectors:

Using the HOT-BIRD material, we have fabricated a variety of MWIR and LWIR FPAs with different pixel pitches (12 µm and above) and formats (up 1K×1K). These FPAs showed excellent image quality with median Noise Equivalent Differential Temperature (NEDT) of <28 mK and uniformity of 99.9%. These results clearly demonstrate that the HOT-BIRD technology can be consistently delivered to space flight instruments.

MWIR Grating Spectrometer (MGS):

Imaging spectrometers comparable to the MGS have been developed in the past. The MGS is currently under development, but none have had the immersion grating. The immersion grating enables a smaller spectrometer than with a plane grating.

Black Silicon Blackbody.

The high emissivity of black silicon and its flat plate construction produce a very compact high performance blackbody. The compact nature of the blackbody enables compact packaging in the CubeSat configuration.

Process Steps

Example Fabrication

Figure 6:
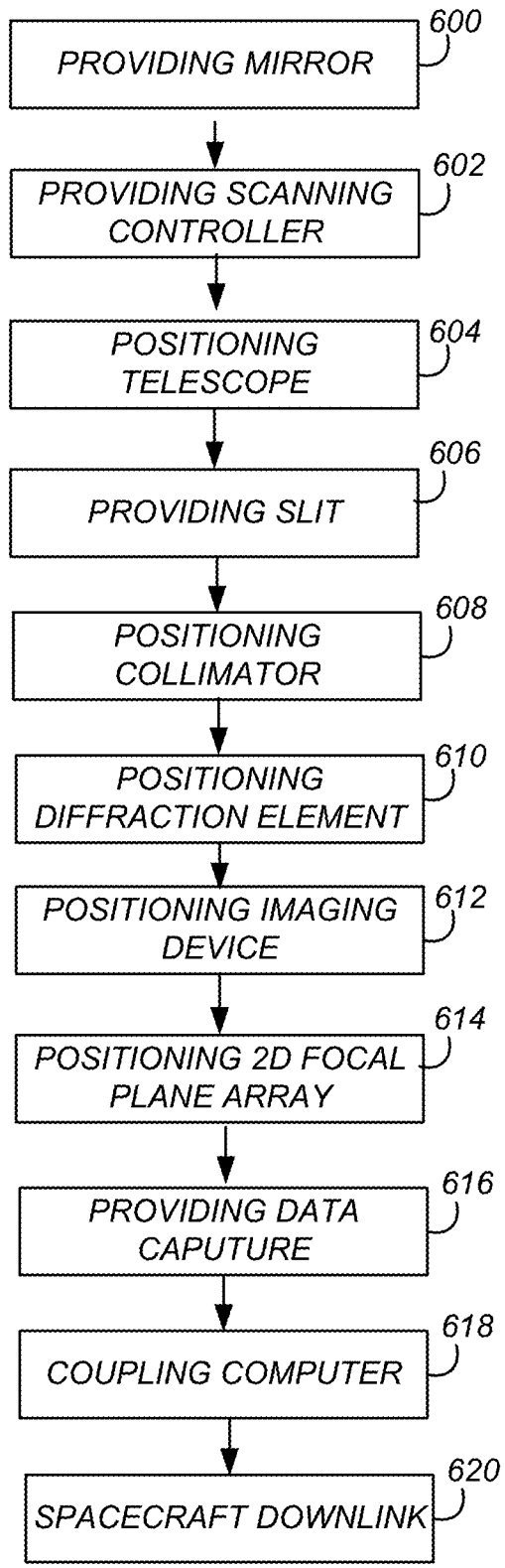
FIG. 6. Flowchart illustrating a method of making an imaging apparatus according to one or more embodiments described herein.

FIG. 6 illustrates a method of making an imaging system or spectrometer (e.g., grating spectrometer).

Block 600 represents optionally providing a mirror collecting the electromagnetic radiation in a field of view. The electromagnetic radiation comprises a plurality of bands of wavelengths.

Block 602 represents providing a circuit, processor, controller, or computer controlling the mirror so that the mirror scans the field of view in a cross track direction comprising the first direction 320 perpendicular to the second direction 324, the second direction parallel to the first length of the slit and parallel to a third direction 450 of movement of the spectrometer (see FIG. 4B). In one or more examples, the scanning is push whisk scanning.

Block 604 represents optionally positioning a telescope or other imaging system between the slit and the mirror, the telescope or other imaging system (e.g., comprising one or more lenses or one or more mirrors) capable of imaging the field of view onto a slit;

Block 606 represents providing the slit having a first length and first width. Block 608 represents positioning a collimator (e.g., one or more lenses or one or more mirrors) between the slit and the diffraction grating, wherein the collimator collimates the electromagnetic radiation transmitted through the slit.

Block 608 represents positioning a collimator.

Block 610 represents providing, electromagnetically coupling, or operably connecting the diffraction grating or other structure for diffracting the electromagnetic radiation. In one or more examples, the diffraction grating comprises a set of grooves formed in the backside or surface of a wafer or block of material (e.g., silicon) so that electromagnetic radiation incident on the set of grooves is diffracted into a plurality of beams of different wavelength. In one or more examples, the wafer or block comprises a polygonal (e.g., prism) shape.

Block 612 represents optionally positioning an imager (e.g., one or more lenses and/or one or more mirrors) imaging each of the beams onto the 2D focal plane array.

Block 614 represents providing, electromagnetically coupling, operably connecting two dimensional (2D) focal plane array to the diffraction grating using imaging optics. The 2D focal plane array comprises an array of pixels including a plurality of sets of pixels, each of the sets having a second width in a first direction 320 and a second length in a second direction 324, wherein the second length of the set of pixels is aligned and parallel to the first length of the slit. The diffraction of electromagnetic radiation transmitted through the slit by the diffraction grating forms a plurality of beams, each of the beams comprising a portion of the electromagnetic radiation comprising a different one of the bands of the wavelengths, so that each of the beams are transmitted onto a different one of the sets of the pixels (or channels).

In one or more examples, the slit has a first width equal to two pixels (two pixel widths) and a first length equal to 504 pixels (504 pixel lengths).

Block 616 represents providing data capture (e.g., electronics or circuit for receiving signals outputted from the pixels in response to the beams).

Block 618 represents optionally coupling one or more computers or processor and/or electronics/a circuit to the spectrometer, the electronics for data capture of Bock 616 receiving signals outputted from the pixels in response to the beams, and wherein the computer rectifies and calibrates the signals.

Block 620 represents providing a spacecraft downlink for communicating the rectified and calibrated signals or weather condition (measured using the signals) to an Earth ground station. The imaging apparatus/spectrometer is embodied in many ways including, but not limited to, the following.

1. The spectrometer 122; 300 comprising the slit, the diffraction grating, and the 2D focal plane array, e.g., as illustrated in FIG. 3C.

2. The spectrometer of embodiment 1, wherein the spectrometer comprises an immersion grating.

3. The spectrometer of embodiment 1 or 2, wherein:
the bands of wavelengths include a first band comprising a first range of infrared wavelengths divided into a first plurality of channels and a second band comprising a second range of infrared wavelengths divided into a second plurality of channels; and
the groups of pixels include a first group of the pixels detecting the first plurality of channels and a second group of the pixels detecting the second plurality of the channels.

4. The spectrometer of embodiment 3, wherein the first band comprises electromagnetic radiation having wavelengths in a range of 4.08-4.6 microns and the second band comprises electromagnetic radiation having wavelengths in a range of 4.6-5.13 microns. In one or more examples, the first plurality of channels includes 312 channels and the second plurality of channels includes 313 channels for a total of 625 channels.

5. The spectrometer of embodiment 1 or 2, wherein:
the bands of wavelengths include a first band, a second band, and optionally a third band,
the groups include a first group of the pixels, a second group of the pixels, and/or a third group of the pixels, each of the groups of pixels detecting a plurality of channels (e.g., n channels, where n is an integer) in each of the bands,
the first groups of the pixels receives or detects the channels in the first band including visible wavelengths forming a spatial image of one or more fields of view transmitting the electromagnetic radiation, and/or
the second group of the pixels receives or detects channels in the second band including a first range of infrared wavelengths, and/or
the third group of the pixels receives or detects the channels in the third band including a second range of infrared wavelengths.

6. The spectrometer of any of the preceding embodiments, wherein:
each of the groups of the pixels include a plurality of sets of the pixels indexed with an integer n according to position along the first direction,
the channels within each band are indexed with the integer n according to position along the first direction,
the wavelength of the $n+1^{th}$ channel is longer than the wavelength of the $n^{th}$ channel, and
the $n^{th}$ set of the pixels receives or detects the $n^{th}$ channel of the wavelengths.

7. The spectrometer of embodiment 6, wherein the $n^{th}$ channel is detected using the nth set of pixels comprising a width of pixels comprising 2 pixels or 1 pixel and a length of pixels comprising a number of pixels in a length of the slit.

8. The spectrometer of embodiments 3-7, wherein the 1st band of wavelengths comprises visible wavelengths.

9. The spectrometer of any of the preceding embodiments, further comprising the mirror and an actuator connected to the mirror, the actuator rotating the mirror and scanning the field of view inputted onto the mirror over one or more regions of a planet's atmosphere or surface (e.g., surface or atmosphere of the Earth).

10. The spectrometer of embodiment 9, wherein the rotating scans the one or more fields of view in a cross track direction comprising the first direction perpendicular to the second direction, the second direction parallel to the first length of the slit and a third direction of movement of the spectrometer or vehicle including the spectrometer.

11. The spectrometer of any of the preceding embodiments, wherein each of the sets include a plurality of subsets of the pixels indexed with an integer m along the second direction parallel to the first length of the slit, each of the subsets including a plurality of the pixels and receiving the electromagnetic radiation forming a spatial image of one of the areas in the field of view.

12. The spectrometer of any of the preceding embodiments, further comprising a computer coupled to the spectrometer, the computer receiving signals outputted from the pixels in response to the beams, wherein the computer generates a weather map using the signals.

13. The spectrometer of embodiment 12, wherein:
the actuator scans the field of view over a plurality of the regions indexed with an integer k along the cross-track direction, the $k^{th}$ region is adjacent the $(k-1)^{th}$ region in the cross-track direction; and the signals comprise a set of signals for each of a plurality of image frames indexed with the integer k, each of the k image frames comprising an image of the field of view including the $k^{th}$ region.

14. The spectrometer of claim 13, wherein each of the set of signals comprise an average of pixels signals outputted from each of the plurality of the pixels in one of the subsets of the pixels indexed with an integer m along the second direction parallel to the first length of the slit. In one or more examples, the average of the pixel signals is performed using a computer or circuit on a spacecraft or satellite.

15. The spectrometer of embodiment 14, wherein each of the Fields of View in the cross track direction is generated by averaging one or more of the frames of data (or averaging one or more of the k image frames) while the projection of the slit is moving on the ground due to the motion of the scanner. In one or more examples, at least 3 image frames are generated in the cross track direction.

16. The spectrometer of any of the preceding embodiments, wherein the field of view along a length of the slit (in the along track direction or second direction) is sufficiently wide (e.g., in a range of 5-25 degrees) so that the scanning in the cross track direction (first direction perpendicular to the second direction) can be slowed or reduced and the integrating is over a longer period of time so that the spectrometer and the aperture receiving the electromagnetic radiation (e.g., surface area of the mirror) can fit inside a CubeSat form factor. In one or more examples, the spectrometer and the aperture fit within a volume of 5 meters by 5 meters.

17. The spectrometer of any of the embodiments 1-16, wherein the slit, the grating, the mirror, the telescope, the collimator, the imager, and the diffraction grating are sized and positioned so that the spectrometer fits inside a volume of 25 centimeters (cm) by 25 centimeter by 15 centimeters (e.g., within a volume of 20 cm×20 cm×10 cm or within a volume of 10×15×10, and/or the spectrometer fits inside (or is physically attached in a package to) a vehicle, spacecraft, aircraft, boat, e.g., an unmanned aerial vehicle, a small land vehicle or rover (e.g., robotic vehicle), a CubeSat, or a drone, or a portable computer or communications device (e.g., laptop, tablet, cellular phone).

18. The spectrometer of the embodiment 17, wherein the slit, the grating, the mirror, the telescope, the collimator, the imager, and the diffraction grating are positioned so that the optical path of the electromagnetic radiation from the mirror to the focal plane array changes direction so as to fit within the volume. In one example, the optical path between the mirror and the grating is in a first direction (e.g., optical axis is a straight line between the mirror and the grating) and the optical path from the grating to the focal plane array is in a second direction at an angle of 100 degree or less (e.g., 90 degrees or less, e.g., in a range of 45 degrees-90 degrees) with respect to the first direction.

19. A satellite (e.g., CubeSat, e.g., 6U CubeSat; 6 unit Cubesat, CIRAS) including the spectrometer 300; 122 of any of the preceding embodiments, wherein the satellite in orbit around a planet (e.g., Earth) and moving in the third direction.

20. The spectrometer of any of the preceding embodiments, wherein the telescope, the collimator and the imager include purely (e.g., consist essentially of) refractive optics.

21. The spectrometer of any of the preceding embodiments, comprising:
a slit having a first length and first width;
a diffraction grating;
a two dimensional (2D) focal plane array electromagnetically coupled to the diffraction grating, the 2D focal plane array comprising an array of pixels including a plurality of groups of the pixels, each of the groups having a second width in a first direction and a second length in a second direction, wherein the second length of the groups of pixels is aligned with and parallel to the first length of the slit; and
wherein:
the slit transmits electromagnetic radiation received on the slit, the electromagnetic radiation comprising a plurality of bands of wavelengths,
the diffraction grating diffracts the electromagnetic radiation transmitted through the slit into a plurality of beams,
each of the beams comprise a portion of the electromagnetic radiation comprising a different one of the bands of the wavelengths, and
each of the beams are transmitted onto a different one of the groups of the pixels (or channels).

22. The spectrometer of any of the preceding embodiments, further comprising:
a mirror collecting the electromagnetic radiation in one or more fields of view;
a telescope positioned between the slit and the mirror, the telescope imaging the one or more areas in the field of view on the slit;
a collimator between the slit and the diffraction grating, wherein the collimator collimates the electromagnetic radiation transmitted through the slit; and
an imager imaging each of the beams onto the 2D focal plane array.

Example Operation

Figure 7:
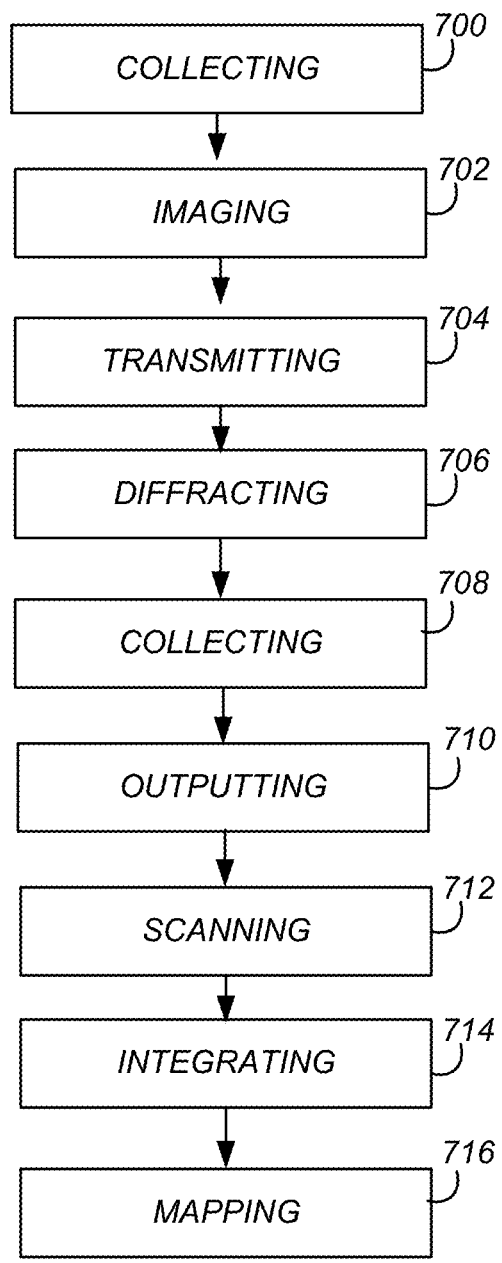
FIG. 7. Flowchart illustrating a method of operating an imaging apparatus according to one or more embodiments described herein.

FIG. 7 illustrates a method of mapping a weather condition (e.g., using the apparatus of FIG. 1, FIG. 3, or FIG. 6) or performing remote sensing, comprising the following steps.

Block 700 represents optionally collecting the electromagnetic radiation in a field of view on a mirror.

Block 702 represents optionally imaging the field of view on the slit using a telescope.

Block 704 represents transmitting electromagnetic radiation through a slit having a first length and first width. The electromagnetic radiation comprises a plurality of bands of wavelengths. In one or more examples, the step comprises collimating the electromagnetic radiation transmitted through the slit.

Block 706 represents diffracting the electromagnetic radiation transmitted through the slit, forming diffracted electromagnetic radiation comprising beams dispersed according to wavelength.

Block 708 represents collecting the diffracted electromagnetic radiation on a two dimensional (2D) focal plane array, the 2D focal plane array comprising an array of pixels, the array including a plurality of sets or groups of pixels, each of the sets having a second width in a first direction and a second length in a second direction, wherein the second length of the set of pixels is aligned with the first length of the slit. Diffraction of electromagnetic radiation transmitted through the slit by the diffraction grating forms a plurality of beams, each of the beams comprising a portion of the electromagnetic radiation comprising a different one of the bands of the wavelengths, and each of the beams transmitted onto a different one of the sets or groups of the pixels comprising channels.

In one or more examples, the 2D focal plane array comprises at type II superlattice barrier infrared detector. In one or more embodiments, the focal plane array is cooled (e.g., in a cryostat or using a cooling system) to below 115 Kelvin.

In one or more examples, the step comprises imaging each of the beams onto the two dimensional 2D focal plane array.

Block 710 represents outputting signals from the pixels in response to the beams of electromagnetic radiation.

In one or more examples, the sets are indexed with an integer n according to position along the first direction, the bands are indexed with the integer n, wherein the $n+1^{th}$ band of wavelengths are longer the $n^{th}$ band of wavelengths, the $n^{th}$ set of the pixels receives the $n^{th}$ band of the wavelengths, each of the sets include a plurality of subsets of the pixels indexed with an integer m along the second direction parallel to the first length of the slit, and each of the subsets including a plurality of the pixels and receiving the electromagnetic radiation forming a spatial image of one of a plurality of areas in the field of view;

Block 712 represents optionally scanning one or more fields of view. In one or more examples, the scanning comprises scanning the one or more fields of view in a cross track direction comprising the first direction perpendicular to the second direction, the second direction parallel to the first length of the slit and a third direction of movement of the spectrometer or vehicle including the spectrometer. In one or more examples, the field of view is scanned over a plurality of the regions of the planet's surface indexed with an integer k along the cross-track direction 450, the $k^{th}$ region is adjacent the $(k-1)^{th}$ region in the cross-track direction; and the signals comprise a set of signals for each of a plurality of image frames indexed with the integer k, each of the k image frames comprising an image of the field of view including the $k^{th}$ region.

Block 714 represents optionally integrating the signals outputted from the pixels in response to the beams. In one or more examples, each of the set of signals comprise an average of pixels signals outputted from each of the plurality of the pixels in one of the subsets of the pixels indexed with an integer m along the second direction parallel to the first length of the slit (see FIGS. 3A, 3B, 3C, and 3D).

Block 716 represents mapping weather or performing remote sensing using the signals. In one more examples, the method comprises receiving, on a computer, the signals outputted from the pixels in response to the beams, wherein the computer generates the weather map using the signals.

Example Hardware

Figure 8:
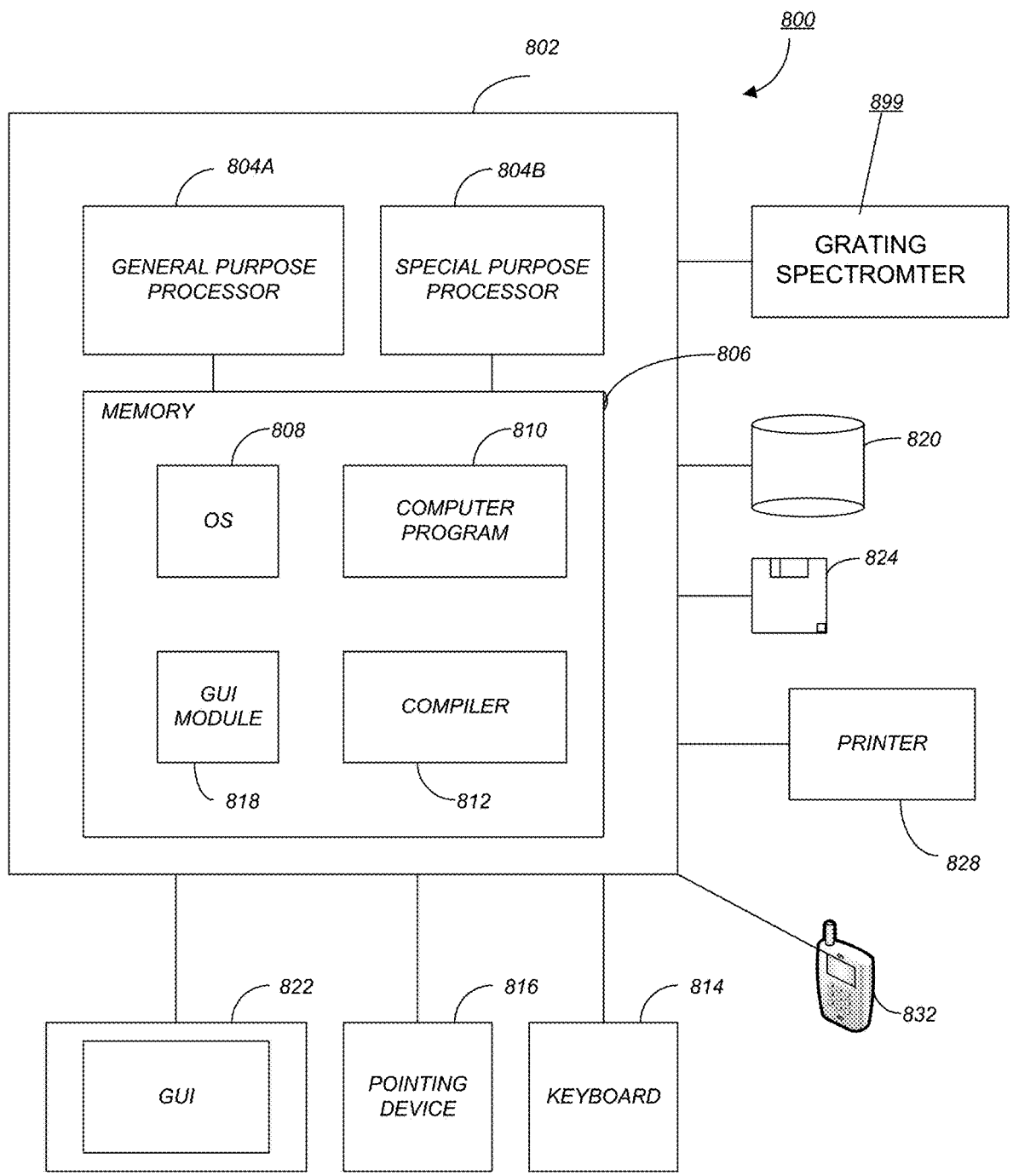
FIG. 8. Hardware environment illustrating a computer that can be coupled to the spectrometer according to embodiments described herein.

FIG. 8 is an exemplary hardware and software environment 800 used to implement one or more embodiments of the processing or methods described herein, including but not limited to, processing elements needed to perform the scanning of the mirror, integration/averaging, weather mapping, remote sensing using the signal, and other image processing functionalities described herein. The hardware and software environment includes a computer 802 and may include peripherals. Computer 802 may be a user/client computer, server computer, or may be a database computer. The computer 802 comprises a general purpose hardware processor 804A and/or a special purpose hardware processor 804B (hereinafter alternatively collectively referred to as processor 804) and a memory 806, such as random access memory (RAM). The computer 802 may be coupled to, and/or integrated with, other devices, including input/output (I/O) devices such as a keyboard 814, a cursor control device 816 (e.g., a mouse, a pointing device, pen and tablet, touch screen, multi-touch device, etc.) and a printer 828. In one or more embodiments, computer 802 may be coupled to, or may comprise, a portable or media viewing/listening device 832 (e.g., an MP3 player, iPod™, Iphone, Nook™, Ipad™, portable digital video player, cellular device, cell phone, smart phone, personal digital assistant, etc.). In yet another embodiment, the computer 802 may comprise a multi-touch device, mobile phone, gaming system, internet enabled television, television set top box, or other internet enabled device executing on various platforms and operating systems.

In one embodiment, the computer 802 operates by the general purpose processor 804A performing instructions defined by the computer program 810 under control of an operating system 808. The computer program 810 and/or the operating system 808 may be stored in the memory 806 and may interface with the user and/or other devices to accept input and commands and, based on such input and commands and the instructions defined by the computer program 810 and operating system 808, to provide output and results.

Output/results may be presented on the display 822 or provided to another device for presentation or further processing or action. In one embodiment, the display 822 comprises a liquid crystal display (LCD) having a plurality of separately addressable liquid crystals. Alternatively, the display 822 may comprise a light emitting diode (LED) display having clusters of red, green and blue diodes driven together to form full-color pixels. Each liquid crystal or pixel of the display 822 changes to an opaque or translucent state to form a part of the image on the display in response to the data or information generated by the processor 804 from the application of the instructions of the computer program 810 and/or operating system 808 to the input and commands. The image may be provided through a graphical user interface (GUI) module 818. Although the GUI module 818 is depicted as a separate module, the instructions performing the GUI functions can be resident or distributed in the operating system 808, the computer program 810, or implemented with special purpose memory and processors.

In one or more embodiments, the display 822 is integrated with/into the computer 802 and comprises a multi-touch device having a touch sensing surface (e.g., track pod or touch screen) with the ability to recognize the presence of two or more points of contact with the surface. Examples of multi-touch devices include mobile devices or smartphones (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 802 according to the computer program 810 instructions may be implemented in a special purpose processor 804B. In this embodiment, the some or all of the computer program 810 instructions may be implemented via firmware instructions stored in a read only memory (ROM), a programmable read only memory (PROM) or flash memory within the special purpose processor 804B or in memory 806. The special purpose processor 804B may also be hardwired through circuit design to perform some or all of the operations to implement the present invention. Further, the special purpose processor 804B may be a hybrid processor, which includes dedicated circuitry for performing a subset of functions, and other circuits for performing more general functions such as responding to computer program 810 instructions. In one embodiment, the special purpose processor 804B is an application specific integrated circuit (ASIC) or the computer can be a field programmable gate array (FPGA).

The computer 802 may also implement a compiler 812 that allows an application or computer program 810 written in a programming language such as COBOL, Pascal, C++, Python, FORTRAN, or other language to be translated into processor 804 readable code. Alternatively, the compiler 812 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 810 accesses and manipulates data accepted from I/O devices and stored in the memory 806 of the computer 802 using the relationships and logic that were generated using the compiler 812.

The computer 802 also optionally comprises an external communication device such as a modem, satellite link, Ethernet card, or other device for accepting input from, and providing output to, other computers 802.

In one embodiment, instructions implementing the operating system 808, the computer program 810, and the compiler 812 are tangibly embodied in a non-transient computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of computer program 810 instructions which, when accessed, read and executed by the computer 802, cause the computer 802 to perform the steps necessary to implement and/or use the present invention or to load the program of instructions into a memory 806, thus creating a special purpose data structure causing the computer 802 to operate as a specially programmed computer executing the method steps described herein. Computer program 810 and/or operating instructions may also be tangibly embodied in memory 806, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 802.

Figure 9:
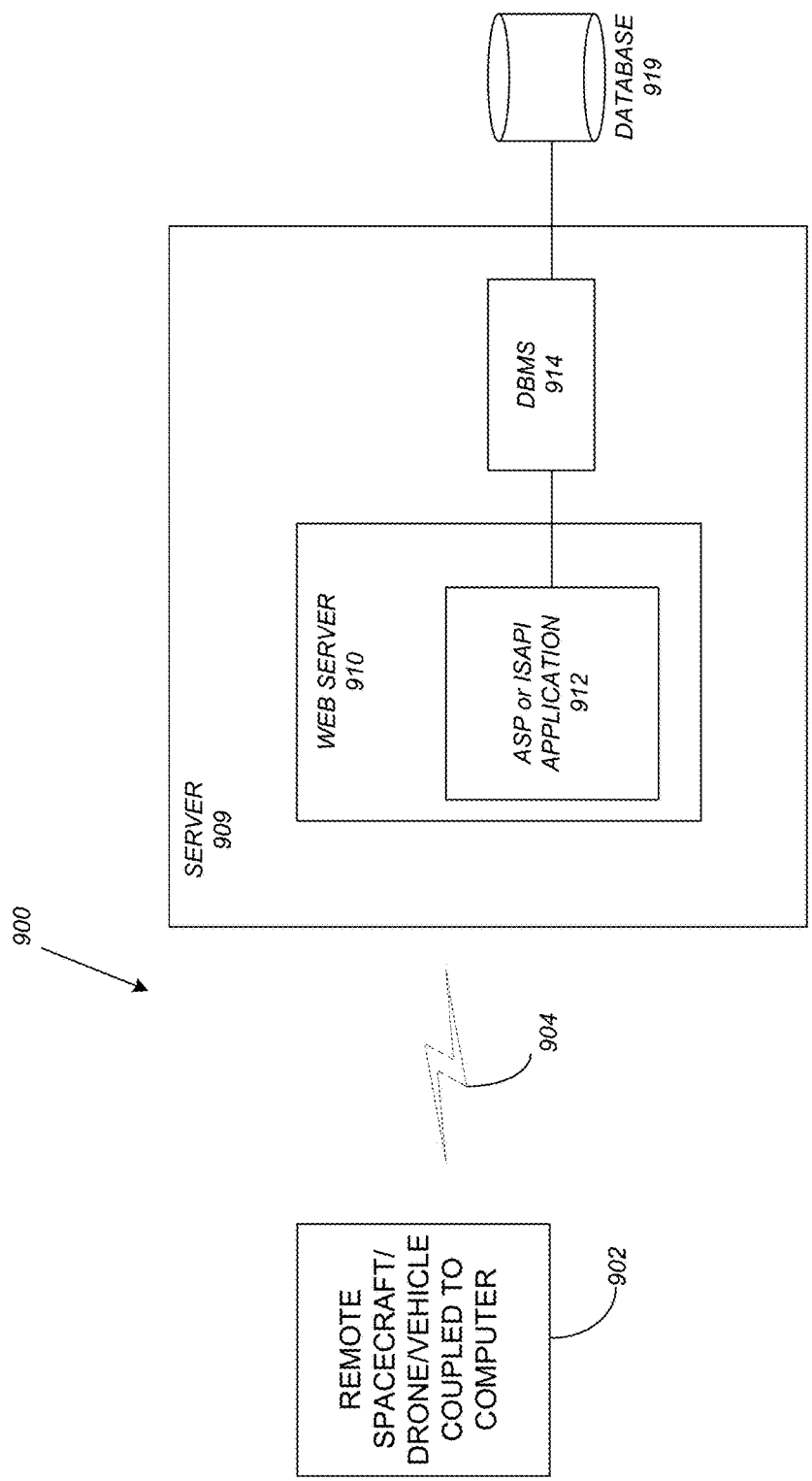
FIG. 9. Hardware environment showing the spacecraft (e.g. CubeSat) coupled to a computer via a network.

FIG. 9 schematically illustrates a typical distributed computer system 900 using a network 904 to connect client computers 902 to server computers 906. A typical combination of resources may include a network 904 comprising the Internet, LANs (local area networks), WANs (wide area networks), SNA (systems network architecture) networks, or the like, clients 902 that are personal computers or workstations (as set forth in FIG. 9), and servers 906 that are personal computers, workstations, minicomputers, or mainframes (as set forth in FIG. 9). However, it may be noted that different networks such as a cellular network (e.g., GSM [global system for mobile communications] or otherwise), a satellite based network, or any other type of network may be used to connect clients 902 and servers 906 in accordance with embodiments of the invention.

A network 904 such as the Internet connects clients 902 to server computers 906. Network 904 may utilize ethernet, coaxial cable, wireless communications, radio frequency (RF), etc. to connect and provide the communication between clients 902 and servers 906. Clients 902 may execute a client application or web browser and communicate with server computers 906 executing web servers 910. Such a web browser is typically a program such as MICROSOFT INTERNET EXPLORER™, MOZILLA FIREFOX™, OPERA™, APPLE SAFARI™, etc. Further, the software executing on clients 902 may be downloaded from server computer 906 to client computers 902 and installed as a plug-in or ACTIVEX™ control of a web browser. Accordingly, clients 902 may utilize ACTIVEX™ components/component object model (COM) or distributed COM (DCOM) components to provide a user interface on a display of client 902. The web server 910 is typically a program such as MICROSOFT'S INTERNET INFORMATION SERVER™.

Web server 910 may host an Active Server Page (ASP) or Internet Server Application Programming Interface (ISAPI) application 912, which may be executing scripts. The scripts invoke objects that execute business logic (referred to as business objects). The business objects then manipulate data in database 916 through a database management system (DBMS) 914. Alternatively, database 916 may be part of, or connected directly to, client 902 instead of communicating/obtaining the information from database 916 across network 904. When a developer encapsulates the business functionality into objects, the system may be referred to as a component object model (COM) system. Accordingly, the scripts executing on web server 910 (and/or application 912) invoke COM objects that implement the business logic. Further, server 906 may utilize MICROSOFT'S™ Transaction Server (MTS) to access required data stored in database 916 via an interface such as ADO (Active Data Objects), OLE DB (Object Linking and Embedding DataBase), or ODBC (Open DataBase Connectivity).

Generally, these components 900-916 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 902 and 906 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 902 and 906.

Advantages and Improvements

Currently, the AIRS and CrIS sounders are used by NASA scientists to improve weather prediction and understand the diurnal cycle in climate studies. Both are also a main part of the nation's operational weather prediction program at NOAA. NASA supports NOAA in the procurement and operationalization of these instruments.

Embodiments of the CIRAS described herein significantly reduce the cost of future IR sounders, building robustness in the program, and enable more funds for other program elements. The compact instrument design provide atmospheric sounding in a CubeSat while offering comparable or better performance as the current atmospheric sounders under development at a small fraction of the cost. Over an order of magnitude cost reduction is possible with the current technology, both in instrument and satellite cost, and in launch costs. This enables expansion of the constellation to improve temporal revisit, and provide a lower cost alternative to a geostationary infrared sounder identified as critical need for next generation forecasts.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A spectrometer, comprising:
a slit having a first length and first width;
a diffraction grating;
a two dimensional (2D) focal plane array electromagnetically coupled to the diffraction grating, the 2D focal plane array comprising an array of pixels including a plurality of groups of the pixels, each of the groups having a second width in a first direction and a second length in a second direction, wherein the second length of the groups of pixels is aligned with and parallel to the first length of the slit;
a mirror collecting electromagnetic radiation in one or more fields of view;
a telescope positioned between the slit and the mirror, the telescope imaging the one or more areas in the one or more fields of view on the slit;
a collimator between the slit and the diffraction grating, wherein the collimator collimates the electromagnetic radiation transmitted through the slit; and
an imager; and
wherein:
the slit transmits the electromagnetic radiation received on the slit, the electromagnetic radiation comprising a plurality of bands of wavelengths,
the diffraction grating diffracts the electromagnetic radiation transmitted through the slit into a plurality of beams,
each of the beams comprise a portion of the electromagnetic radiation comprising a different one of the bands of the wavelengths,
the imager images each of the beams onto the 2D focal plane array,
each of the beams are transmitted onto a different one of the groups of the pixels
the slit, the mirror, the telescope, the collimator, the imager, and the diffraction grating are sized and positioned so that at least one of:
the spectrometer fits inside a volume of 25 centimeters by 25 centimeter by 15 centimeters, or
the spectrometer fits inside an unmanned aerial vehicle, a CubeSat, a drone, or a portable computer or communications device.

2. The spectrometer of claim 1, wherein the diffracting grating comprises an immersion grating.

3. The spectrometer of claim 1, wherein:
the bands of wavelengths include a first band comprising a first range of visible or infrared wavelengths divided into a first plurality of channels and a second band comprising a first range or a second range of infrared wavelengths divided into a second plurality of the channels; and
the groups of pixels include a first group of the pixels detecting the first plurality of channels and a second group of the pixels detecting the second plurality of the channels.

4. The spectrometer of claim 3, wherein:
the bands of wavelengths include the first band and at least one of the second band or a third band,
the groups include a first group of the pixels and at least one of the second group of the pixels or a third group of the pixels, each of the groups of pixels detecting a plurality of the channels in each of the bands,
the first group of the pixels receives or detects the channels in the first band including the visible wavelengths forming a spatial image of the one or more fields of view transmitting the electromagnetic radiation, and at least one of:
the second group of the pixels receives or detects the channels in the second band including the first range of infrared wavelengths, or
the third group of the pixels receives or detects the channels in the third band including the second range of infrared wavelengths.

5. The spectrometer of claim 3, wherein:
each of the groups of the pixels include a plurality of sets of the pixels indexed with an integer n according to position along the first direction,
the channels within each of the bands are indexed with the integer n according to position along the first direction, the wavelength of the $n+1^{th}$ channel is longer than the wavelength of the $n^{th}$ channel, and
the $n^{th}$ set of the pixels are positioned to receive and detect the $n^{th}$ channel of the wavelengths.

6. The spectrometer of claim 5, wherein the first band of wavelengths comprises the visible wavelengths.

7. An unmanned aerial vehicle or a drone attached to the spectrometer of claim 1.

8. The spectrometer of claim 1, wherein:
the collimator comprises a first lens or a first mirror, and
the imager comprises at least one of a second lens or a second mirror.

9. A CubeSat comprising or attached to the spectrometer of claim 1.

10. A method of mapping a weather condition using the spectrometer of claim 1, comprising:
collecting electromagnetic radiation in a field of view on the mirror;
imaging the field of view on the slit using the telescope;
transmitting electromagnetic radiation through the slit;
diffracting, using a diffraction grating, the electromagnetic radiation transmitted through the slit, forming diffracted electromagnetic radiation comprising a plurality of beams;
collimating, using a collimator, the electromagnetic radiation transmitted through the slit; and
imaging, using an imager, each of the beams onto a 2D focal plane array so as to
collect the diffracted electromagnetic radiation on the 2D focal plane;
outputting signals from the pixels in response to the beams of electromagnetic radiation;
and mapping weather using the signals.

11. The method of claim 10, further comprising:
scanning the field of view inputted onto the mirror over a plurality of regions of a planet's atmosphere or surface; and/or
receiving, on a computer, the signals outputted from the pixels in response to the beams, wherein the computer generates a weather map using the signals.

12. The method of claim 11, further comprising scanning the field of view in a cross track direction comprising the first direction perpendicular to the second direction, and wherein the second direction is (1) parallel to the first length of the slit and (2) parallel to a third direction of movement of a satellite including the spectrometer.

13. The method of claim 12, wherein:
the sets are indexed with an integer n according to position along the first direction,
the bands are indexed with the integer n, wherein the n+1$^{th}$ band of wavelengths are longer than the n$^{th}$ band of wavelengths,
the n$^{th}$ set of the pixels receives the n$^{th}$ band of the wavelengths,
each of the sets include a plurality of subsets of the pixels indexed with an integer m along the second direction parallel to the first length of the slit, each of the subsets including a plurality of the pixels and receiving the electromagnetic radiation forming a spatial image of one of a plurality of areas in the field of view,
the mirror scans the field of view over a plurality of regions indexed with an integer k along the cross-track direction, the k$^{th}$ region adjacent the (k−1)$^{th}$ region in the cross-track direction,
the signals comprise a set of signals for each of a plurality of image frames indexed with the integer k, each of the k image frames comprising an image of the field of view including the k$^{th}$ region, and
the method further comprising integrating the signals so that each of the sets of signals comprise an average of pixel signals outputted from each of the plurality of the pixels in one of the subsets of the pixels.

14. A spectrometer, comprising:
a slit having a first length and first width;
a diffraction grating;
a two dimensional (2D) focal plane array electromagnetically coupled to the diffraction grating, the 2D focal plane array comprising an array of pixels including a plurality of groups of the pixels, each of the groups having a second width in a first direction and a second length in a second direction, wherein the second length of the groups of pixels is aligned with and parallel to the first length of the slit;
a mirror collecting electromagnetic radiation in one or more fields of view;
a telescope positioned between the slit and the mirror, the telescope imaging one or more areas in the one or more fields of view on the slit;
a collimator between the slit and the diffraction grating, wherein the collimator collimates the electromagnetic radiation transmitted through the slit;
an imager; and
an actuator connected to the mirror, the actuator rotating the mirror and scanning the one or more fields of view inputted onto the mirror over one or more regions of a planet's atmosphere or surface, wherein the rotating scans the one or more fields of view in a cross-track direction comprising the first direction perpendicular to the second direction, and wherein the second direction is (1) parallel to the first length of the slit and (2) parallel to a third direction of movement of the spectrometer or a vehicle including the spectrometer; and
wherein:
the slit transmits the electromagnetic radiation received on the slit, the electromagnetic radiation comprising a plurality of bands of wavelengths,
the diffraction grating diffracts the electromagnetic radiation transmitted through the slit into a plurality of beams,
each of the beams comprise a portion of the electromagnetic radiation comprising a different one of the bands of the wavelengths,
the imager images each of the beams onto the 2D focal plane array, and
each of the beams are transmitted onto a different one of the groups of the pixels.

15. The spectrometer of claim 14, wherein:
the pixels include a plurality of sets of the pixels,
each of the sets of pixels include a plurality of subsets of the pixels indexed with an integer m along the second direction parallel to the first length of the slit, and
each of the subsets including a plurality of the pixels and receiving the electromagnetic radiation forming a spatial image of one of the areas in the one or more fields of view.

16. A satellite including the spectrometer of claim 15, wherein the satellite is in orbit around Earth and moving in the third direction.

17. The spectrometer of claim 16, further comprising a computer coupled to the spectrometer, the computer receiving signals outputted from one or more of the pixels in response to the beams, wherein the computer generates a weather map using the signals.

18. The spectrometer of claim 17, wherein:
the actuator scans the one or more fields of view over a plurality of the regions indexed with an integer k along the cross-track direction, the k$^{th}$ region is adjacent the (k−1)$^{th}$ region in the cross-track direction, and
the signals comprise a set of signals for each of a plurality of image frames indexed with the integer k, each of the k image frames comprising an image of the one or more fields of view including the k$^{th}$ region.

19. The spectrometer of claim 18, wherein each of the set of signals comprise an average of pixel signals outputted from each of the plurality of the pixels in one of the subsets of the pixels indexed with the integer m along the second direction parallel to the first length of the slit.

20. A method of making a spectrometer, comprising:
positioning a slit having a first length and first width;
positioning a diffraction grating;
electromagnetically coupling a two dimensional (2D) focal plane array to the diffraction grating, the 2D focal plane array comprising an array of pixels including a plurality of groups of the pixels, each of the groups having a second width in a first direction and a second length in a second direction, wherein the second length of the groups of pixels is aligned with and parallel to the first length of the slit;
positioning a mirror collecting electromagnetic radiation in one or more fields of view;
positioning a telescope between the slit and the mirror, the telescope imaging one or more areas in the one or more fields of view on the slit;
positioning a collimator between the slit and the diffraction grating, wherein the collimator collimates the electromagnetic radiation transmitted through the slit; and
positioning an imager;
wherein:
the slit transmits the electromagnetic radiation received on the slit, the electromagnetic radiation comprising a plurality of bands of wavelengths,
the diffraction grating diffracts the electromagnetic radiation transmitted through the slit into a plurality of beams, each of the beams comprise a portion of the electromagnetic radiation comprising a different one of the bands of the wavelengths, the imager images each of the beams onto the 2D focal plane array, each of the beams are transmitted onto a different one of the groups of the pixels, and the slit, the mirror, the telescope, the collimator, the imager, and the diffraction grating are sized and positioned so that at least one of:

the spectrometer fits inside a volume of 25 centimeters by 25 centimeter by 15 centimeters, or the spectrometer fits inside an unmanned aerial vehicle, a CubeSat, a drone, or a portable computer or communications device.

* * * * *